United States Patent
McPheeters

(10) Patent No.: US 9,868,485 B2
(45) Date of Patent: Jan. 16, 2018

(54) SUPPORT STRUCTURES FOR MOBILITY DEVICES

(71) Applicant: Greg McPheeters, Santa Clara, CA (US)

(72) Inventor: Greg McPheeters, Santa Clara, CA (US)

(73) Assignee: Moved By Bikes LLC, Santa Cruz, CA (US)

( * ) Notice: Subject to any disclaimer, the term of this patent is extended or adjusted under 35 U.S.C. 154(b) by 638 days.

(21) Appl. No.: 13/889,313

(22) Filed: May 7, 2013

(65) Prior Publication Data

US 2013/0292437 A1    Nov. 7, 2013

Related U.S. Application Data

(60) Provisional application No. 61/643,817, filed on May 7, 2012.

(51) Int. Cl.
| | | |
|---|---|---|
| B62J 9/00 | (2006.01) | |
| B62J 7/00 | (2006.01) | |
| B62J 11/00 | (2006.01) | |
| B62J 99/00 | (2009.01) | |

(52) U.S. Cl.
CPC . B62J 9/00 (2013.01); B62J 7/00 (2013.01); B62J 11/00 (2013.01); B62J 2099/0073 (2013.01)

(58) Field of Classification Search
CPC ............... B62J 9/00; B62J 11/00; B62J 7/00
USPC .................................. 224/412, 920, 925
See application file for complete search history.

(56) References Cited

U.S. PATENT DOCUMENTS

| | | | | |
|---|---|---|---|---|
| 3,659,761 | A * | 5/1972 | Wesson ...................... | B62J 7/02 224/425 |
| 4,460,190 | A * | 7/1984 | Spiess .................... | A61G 5/023 280/247 |
| 4,705,284 | A * | 11/1987 | Stout ...................... | A61G 5/025 280/250.1 |
| 4,915,276 | A * | 4/1990 | Devito ..................... | B60R 9/06 224/500 |
| 5,050,785 | A * | 9/1991 | Hays ........................ | B60R 9/06 224/511 |
| 5,082,123 | A * | 1/1992 | Lamb ..................... | A47B 81/00 211/18 |
| 5,096,102 | A * | 3/1992 | Tolson ..................... | B60R 9/06 224/501 |
| 5,190,195 | A * | 3/1993 | Fullhart .................... | B60R 9/10 224/497 |
| 5,634,650 | A * | 6/1997 | Hensler, Sr. ............. | A61G 5/00 280/250.1 |
| 5,639,001 | A * | 6/1997 | Brady ..................... | B62J 11/00 224/416 |

(Continued)

*Primary Examiner* — Brian D Nash
(74) *Attorney, Agent, or Firm* — Kramer Levin Naftalis & Farnkel LLP

(57) ABSTRACT

Described herein is a new assembly of components which comprise a support arm on the side of a bicycle or similar mobility device. The structure is capable of carrying long thin items such as a long surfboard, or it can be used to secure a pet such as a dog to allow them to walk or run safely alongside a bicycle. The invention is designed to fit a wide range of devices, and is optimized for maximum ease of installation and quick release removal without any tools.

25 Claims, 7 Drawing Sheets

(56) References Cited

U.S. PATENT DOCUMENTS

| | | | | |
|---|---|---|---|---|
| 6,062,451 A * | 5/2000 | Lassanske | ............... | B60R 9/10 |
| | | | | 224/502 |
| 6,203,043 B1 * | 3/2001 | Lehman | ............... | B62K 3/005 |
| | | | | 280/124.136 |
| 6,354,557 B1 * | 3/2002 | Walsh | ............... | B62K 19/36 |
| | | | | 248/408 |
| 6,443,252 B1 * | 9/2002 | Andes | ............... | A61G 5/10 |
| | | | | 180/65.1 |
| 6,644,525 B1 * | 11/2003 | Allen | ............... | B60R 9/06 |
| | | | | 224/282 |
| 8,388,254 B2 * | 3/2013 | Huang | ............... | F16B 7/105 |
| | | | | 403/109.1 |
| 9,216,786 B1 * | 12/2015 | Huber | ............... | B62J 1/00 |
| 2002/0043544 A1 * | 4/2002 | Caneba | ............... | A45C 13/262 |
| | | | | 224/584 |
| 2003/0201289 A1 * | 10/2003 | Swain | ............... | B62D 35/007 |
| | | | | 224/519 |
| 2008/0135592 A1 * | 6/2008 | Corso | ............... | B60R 9/02 |
| | | | | 224/555 |
| 2009/0261136 A1 * | 10/2009 | Skoff | ............... | B60R 9/08 |
| | | | | 224/519 |
| 2012/0126507 A1 * | 5/2012 | Wayman | ............... | B62K 13/06 |
| | | | | 280/281.1 |
| 2012/0206004 A1 * | 8/2012 | Wishart | ............... | B62M 6/45 |
| | | | | 310/121 |
| 2014/0182094 A1 * | 7/2014 | Zuraski | ............... | B62H 5/00 |
| | | | | 24/456 |
| 2015/0210346 A1 * | 7/2015 | Lofgren | ............... | B62L 3/02 |
| | | | | 280/249 |
| 2016/0016625 A1 * | 1/2016 | Williams | ............... | B62M 6/55 |
| | | | | 280/287 |

* cited by examiner

ASSEMBLED VIEW

ASSEMBLED VIEW

ASSEMBLED VIEW

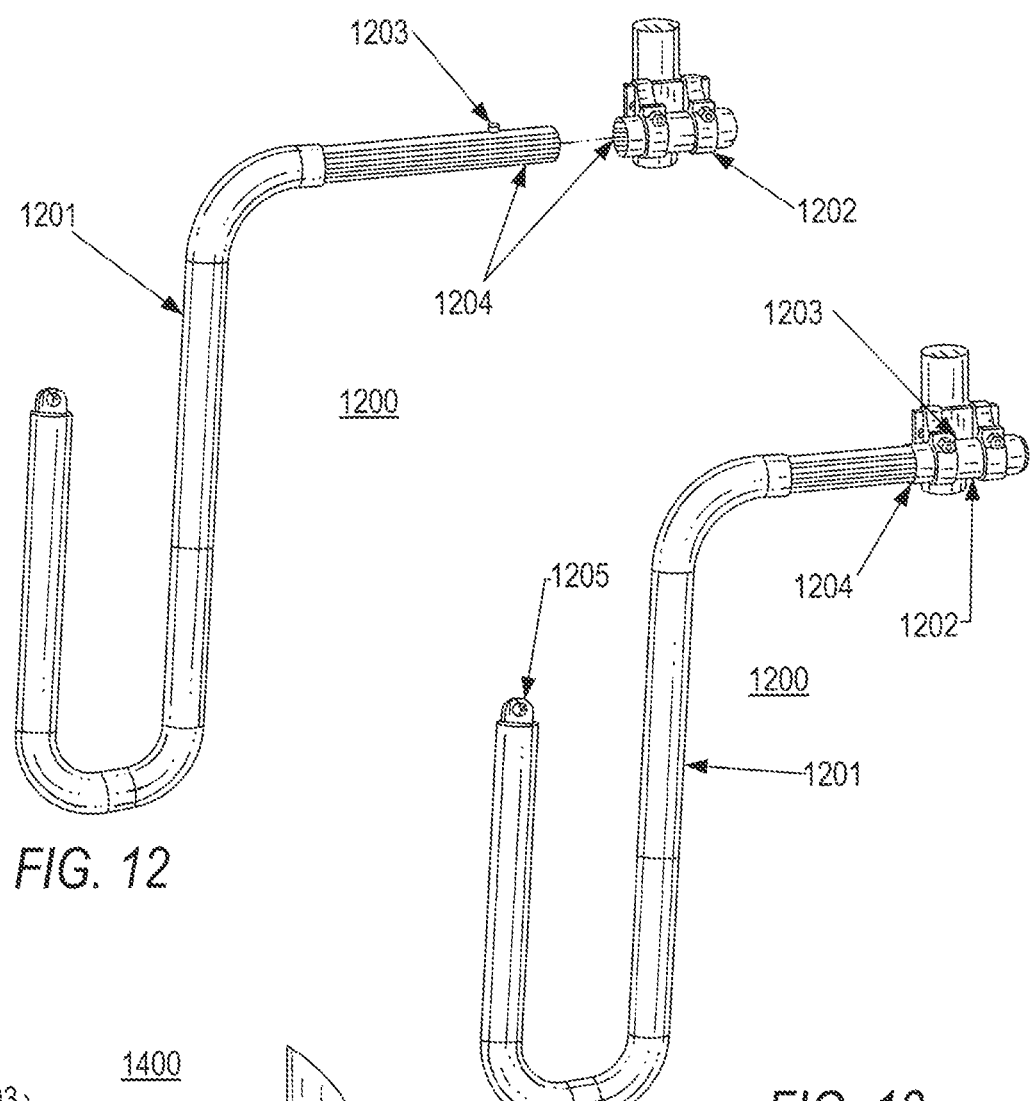
FIG. 12
FIG. 13
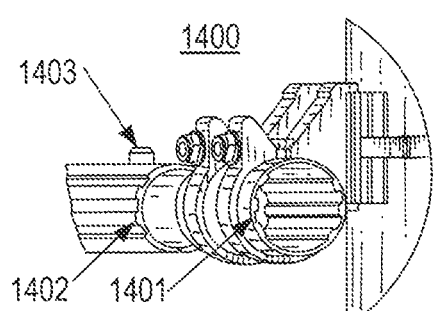
FIG. 14

SUPPORT STRUCTURES FOR MOBILITY DEVICES

CROSS-REFERENCE TO RELATED APPLICATIONS

This application claims the benefit of U.S. Provisional Application No. 61/643,817, filed May 7, 2012, which is incorporated by reference herein in its entirety.

BACKGROUND OF THE DISCLOSURE

As bicycling continues to grow in popularity and as a viable means of transportation, it is increasingly useful to have cost effect means of using standard bicycles to accomplish everyday tasks. Typical bicycles require the rider to keep both hands on the handle bars to safely steer the vehicle from destination to destination. It is, therefore, dangerous or impossible for the rider to hold carry objects while riding. Some bicycles are equipped with storage racks or baskets for safely holding small objects. However, there are many objects for which these current storage systems are woefully inadequate.

SUMMARY OF THE DISCLOSURE

Support structures for mobility devices are disclosed. The following embodiments and aspects thereof are described and illustrated in conjunction with systems, tools, and methods that are meant to be exemplary and illustrative, not limiting in scope. In various embodiments, one or more of the above-described problems have been reduced or eliminated, while other embodiments are directed to other improvements.

Assemblies of components forming support structures for mobility devices are disclosed that are adaptable to a wide range of mounting configurations on any convenient and/or known mobility devices, including bicycles or other mobility device frames. In some embodiments, a "front assembly" can be constructed from a set of mounting components mounted to the front steer tube of the bicycle. A "rear assembly" can either be mounted to the rear seat post, to a rear rack attached to the bicycle, and/or any other suitable mounting point.

The components disclosed herein have been optimized to work with a wide range of bicycle types, sizes, and designs. Mounting to the front head tube and the rear seat tube or rear rack can ensure that the side-mounted support structures can be very strong and stiff, and can ensure stable load carrying of long, heavy loads (e.g., surfboards). Mounting support structures to the front head tube may also be ideal for attaching a pet's leash to allow the pet to run alongside the bicycle.

The support structures may include a keyed mounting tube coupled to the bicycle frame, into which side supports can slide. The keying in the tube may prevent rotation of the supports despite substantial torque on the mounted tube, allowing for a quick release function for the supports that may be operated using a relatively minor push button. By making the mounting tube round and securing the mounting tube with round clamps, the angle and orientation of the side supports can be optimized for any particular bicycle and/or object to be carried. By making it extremely easy to remove the side supports (e.g., without any tools) the racks can be adaptable when they are needed, but quickly removed so that they are not in the way when they are not needed or when storing the bicycle or mobility device.

The proposed system, method and device can offer, among other advantages, improved load carrying and versatility because mounting points can be established at the front and back of a typical mobility device. Advantageously, the support structures can be installed in a variety of configurations and can be removed very quickly with no tools or release levers; a simple push button can serve this purpose because of the keying on the support structures. In other embodiments, however, tools can be used to install and remove the support structures. These and other advantages of the present invention will become apparent to those skilled in the art upon a reading of the following descriptions and a study of the several figures of the drawings.

BRIEF DESCRIPTION OF THE DRAWINGS

The above and other aspects of the invention, its nature, and various features will become more apparent upon consideration of the following detailed description, taken in conjunction with the accompanying drawings, in which like reference characters refer to like parts throughout, and in which:

FIG. 12 shows a perspective view of a partially assembled support structure 1200 for a mobility device in accordance with some embodiments;

FIG. 13 shows a perspective view of an assembled support structure 1200 for a mobility device in accordance with some embodiments;

FIG. 14 depicts a detailed view of a mounting system 1400 including keying features 1401 and 1402 in accordance with some embodiments.

DETAILED DESCRIPTION OF THE DISCLOSURE

Embodiments of the inventions are illustrated in the figures. However, the embodiments and figures are illustrative rather than limiting; they provide examples of the invention. As used herein, the term "embodiment" means an embodiment that serves to illustrate by way of example but not limitation.

Moreover, in the following description, several specific details are presented to provide a thorough understanding of embodiments of the invention. One skilled in the relevant art will recognize, however, that the invention can be practiced without one or more of the specific details, or in combination with other components, etc. In other instances, well-known implementations or operations are not shown or described in detail to avoid obscuring aspects of various embodiments, of the invention.

The support structures as described herein may be designed to attach to any number of vehicles but have been optimized to attach to a typical bicycle frame. Bicycles typically include a head tube (i.e., where the front fork rotates in the frame) and a rear seat tube (i.e., where the rider sits). These two locations offer very strong attachment points for accessory supports. Some bicycles also feature cargo racks that are even further back on the bike, which can offer yet another strong attachment point.

Attaching support structures to a mobility device can have any number of benefits. For instance, support structures can be curved to cradle a long surfboard, an object that is otherwise very difficult to carry on a bicycle. It is common to see surfers riding to the beach with their surfboard under one arm, but this mode of transportation can be dangerous as surfers only have one arm left to control the bicycle or vehicle they are riding. Other long objects that may be carried on accessory supports could include ladders, yard tools, lumber or pipe, or any number of long, skinny objects.

Another benefit of mounting support structures on the side of a bicycle can be for securing a pet, such as a dog, for daily walks or to take them with you on trips. It is common to see people riding bikes while holding their pet's leash in one hand. Just like with the surfboard, the leash hand is not available to control the bike, and with the unpredictable nature of a pet on a street, this can be extremely dangerous. Securing the pet to an accessory support attached to a bicycle, especially if the support can also prevent the pet from running into the moving parts of the bicycle such as the wheels, provides a tremendous safety benefit to both the owner and the pet.

Figure 1:
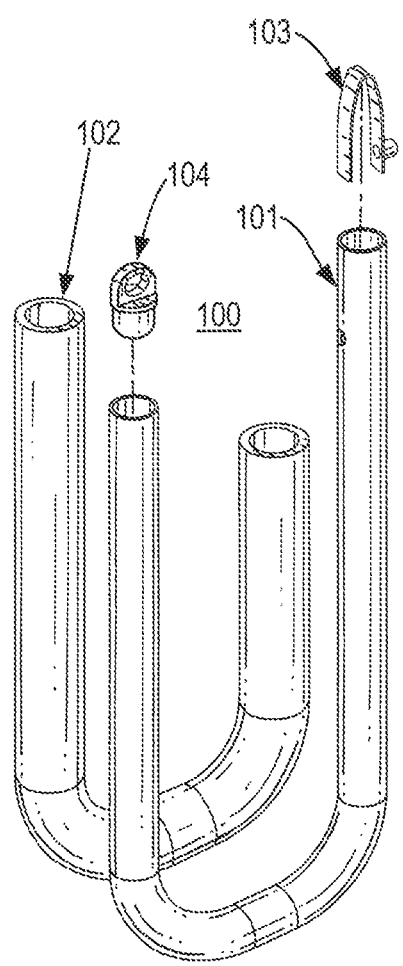
FIG. 1 shows an unassembled bottom tube assembly 100 of an accessory support for a mobility device in accordance with some embodiments.

FIG. 1 shows an unassembled bottom tube assembly 100 of an accessory support for a mobility device in accordance with some embodiments. Bottom tube assembly 100 can include a base tube 101, a covering 102, a spring button 103, and an attachment ring 104. Bottom tube assembly 100 can be mounted to a mobility device in order to safely and securely hold one or more objects as described in more detail below.

Base tube 101 can be a hollow or partially hollow U-shaped tube. The U-shape can enable the accessory support to hold an object in place using gravity and/or friction. In particular, an object may be placed in bottom tube assembly 100 such that it rests against the bottom and/or sides of base tube 101. Base tube 101 may be formed from any suitable material that can hold one or more objects while resisting significant deformation and/or adverse effects of weather. For example, base tube 101 may be formed from a metal (e.g., stainless steel or aluminum), a plastic (e.g., PVC), a composite, and/or any other suitable material.

Covering 102 may be a sheath that covers base tube 101 of bottom tube assembly 100 to protect base tube 101 as well as an object supported by base tube 101. Accordingly, covering 102 can be formed of foam or a similar soft material. According to various embodiments, covering 102 may be slid onto base tube 101 or formed on base tube 101 using any suitable process (e.g., injection molding).

Spring button 103 can be a resiliently deformable U-shaped member that includes one or more projections that can act as buttons. Spring button 103 can be inserted into one end of base tube 101 such that at least one projection can pass through a hole in base tube 101 to lock spring button 103 into place. Accordingly, a user can press the portion of spring button 103 protruding from base tube 101 to easily disengage bottom tube assembly 100 from one or more elements of an accessory support (e.g., top tube assembly 300 of FIG. 3, below). The resiliency of spring button 103 can allow a user to disengage and reengage bottom tube assembly from the accessory support any suitable number of times without spring button 103 becoming worn out. Thus, spring button 103 may be made from a material such as stainless steel, for example. In some embodiments, spring button 103 may include a spring member (not shown) bridging the gap between either side of the U such that spring button 103 returns to the proper shape after each depression.

Attachment ring 104 can be inserted into a second end of base tube 101 in any suitable manner. For example, attachment ring 104 may be press fit, bonded, or mechanically secured into the end of second end of base tube 101. In some embodiments, attachment ring 104 may include a loop for tying an object to the second end of base tube 101 (e.g., the end of a dog's leash). Attachment ring 104 may also, or alternatively, be used to keep water and/or debris out of base tube 101. Attachment ring 104 may be formed from any suitable material (e.g., plastic).

Figure 2:
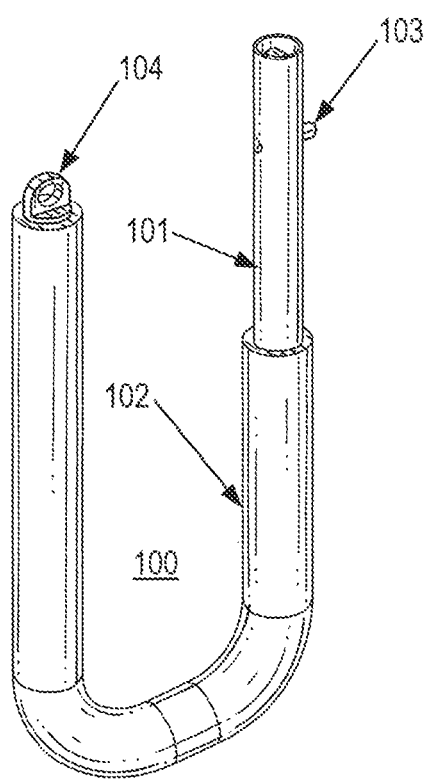
FIG. 2 shows an assembled bottom tube assembly 100 of an accessory support for a mobility device in accordance with some embodiments.

FIG. 2 shows an assembled bottom tube assembly 100 of an accessory support for a mobility device in accordance with some embodiments. In particular, assembled bottom tube assembly 100 may correspond to an assembled version of unassembled bottom tube assembly 100 of FIG. 1. Covering 102 can cover any suitable portion of base tube 101 in order to adequately protect both base tube 101 and objects carried in bottom tube assembly 100. In some embodiments, and as shown, covering 102 may not cover the portion of base tube 101 that holds spring button 103 to ensure that the user has easy access to spring button 103. In other embodiments, covering 102 may cover the entirety of base tube 101 with the exception of a cutout for access to spring button 103.

Figure 3:
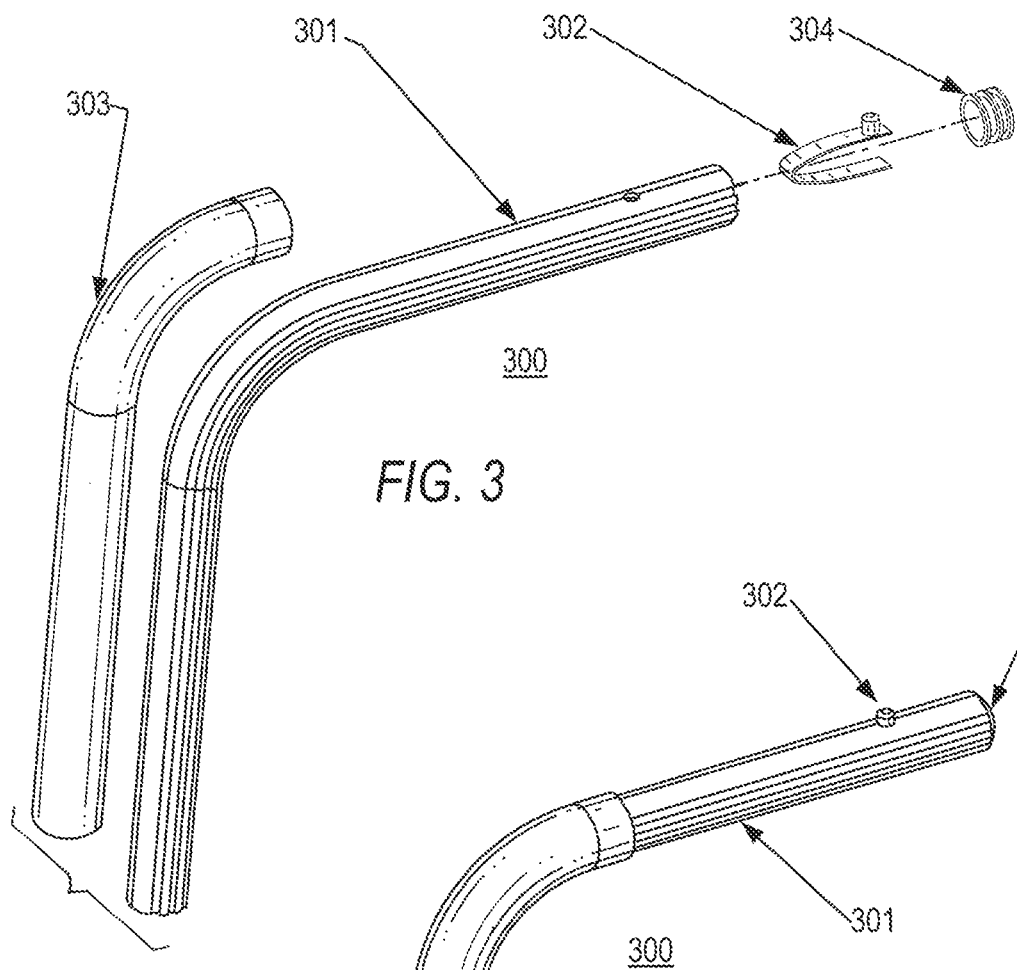
FIG. 3 shows an unassembled top tube assembly 300 of an accessory support for a mobility device in accordance with some embodiments.

FIG. 3 shows an unassembled top tube assembly 300 of an accessory support for a mobility device in accordance with some embodiments. Top tube assembly 300 can include a mounting tube 301, a spring button 302, a covering 303, and an end plug 304. Top tube assembly 300 may be coupled to a bottom tube assembly (e.g., bottom tube assembly 200 of FIG. 2) to form a portion of an accessory support for a mobility device.

Mounting tube 301 may be an L-shaped member including a horizontal portion that projects horizontally away from the mobility device and a vertical portion that projects downward toward the ground when mounting tube 301 is installed on the mobility device. The vertical portion of mounting tube 301 may be slid into a corresponding tube of a bottom tube assembly 100 (e.g., a first end of base tube 101 of FIG. 2). Mounting tube 301 may be removably coupled to the bottom tube assembly with a spring button (e.g., spring button 103 of FIG. 2). The horizontal portion of mounting tube 301 can be coupled to a mounting system (e.g., mounting system 500 of FIG. 6, below).

In some embodiments of the invention, mounting tube 301 may be formed with keying features along its entire length or a portion of its length. The keying features may be grooves or indentations that, when slid into a tube with complementary features, prevent rotation of mounting tube 301 even under considerable torque. Thus, mounting tube 301 may be coupled to the frame of a mobility device at any suitable angle without mounting tube 301 rotating out of position. Like base tube 101 of FIG. 1, mounting tube 301 may be formed from any suitable material that can hold one or more objects while resisting significant deformation and/or adverse effects of weather. For example, mounting tube 301 may be formed from a metal (e.g., stainless steel or aluminum), a plastic (e.g., PVC), a composite, and/or any other suitable material.

Covering 303 may be a sheath that covers mounting tube 301 of bottom tube assembly 300 to protect mounting tube 301 as well as an object supported by mounting tube 301. In some embodiments, covering 303 may be substantially similar to covering 102 of FIG. 2, except that covering 303 may be used to cover mounting tube 301 rather than base tube 101. Accordingly, covering 302 can be formed of foam or a similar soft material. According to various embodiments, covering 303 may be slid onto mounting tube 301 or formed on mounting tube 301 using any suitable process (e.g., injection molding).

Spring button 302 can be a resiliently deformable U-shaped member that includes one or more projections that can act as buttons and may be substantially similar to spring button 103 of FIG. 1. Spring button 302 can be inserted into one end of mounting tube 301 such that at least one projection can pass through a hole in mounting tube 301 to lock spring button 303 into place. Accordingly, a user can press the portion of spring button 302 protruding from mounting tube 301 to easily disengage top tube assembly 300 from one or more elements of an mounting system (e.g., mounting system 500 of FIG. 6, below). The resiliency of spring button 302 can allow a user to disengage and reengage bottom tube assembly from the accessory support any suitable number of times without spring button 302 becoming worn out. Thus, spring button 302 may be made from a material such as stainless steel, for example. In some embodiments, spring button 302 may include a spring member (not shown) bridging the gap between either side of the U such that spring button 302 returns to the proper shape after each depression.

End plug 304 can be inserted into the end of the horizontal portion of mounting tube 301 in any suitable manner. For example, end plug 304 may be press fit, bonded, or mechanically secured into the end of second end of mounting tube 301. End plug 304 may be used to keep water and/or debris out of mounting tube 301 and may be formed from any suitable material (e.g., plastic).

Figure 4:
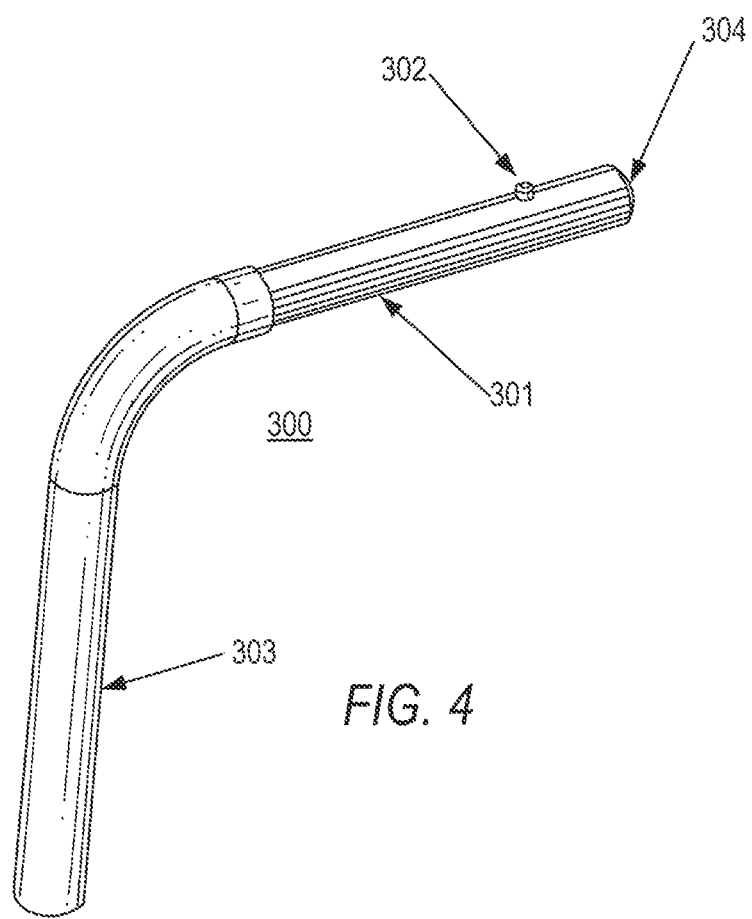
FIG. 4 shows an assembled bottom tube assembly 300 of an accessory support for a mobility device in accordance with some embodiments.

FIG. 4 shows an assembled bottom tube assembly 300 of an accessory support for a mobility device in accordance with some embodiments. In particular, assembled bottom tube assembly 300 may correspond to an assembled version of unassembled bottom tube assembly 300 of FIG. 3. Covering 302 can cover any suitable portion of mounting tube 301 in order to adequately protect both mounting tube 301 and objects supported by top tube assembly 300. In some embodiments, and as shown, covering 302 may not cover the portion of mounting tube 301 that holds spring button 303 to ensure that the user has easy access to spring button 303. In other embodiments, covering 302 may cover the entirety of mounting tube 301 with the exception of a cutout for access to spring button 303.

Figure 5:
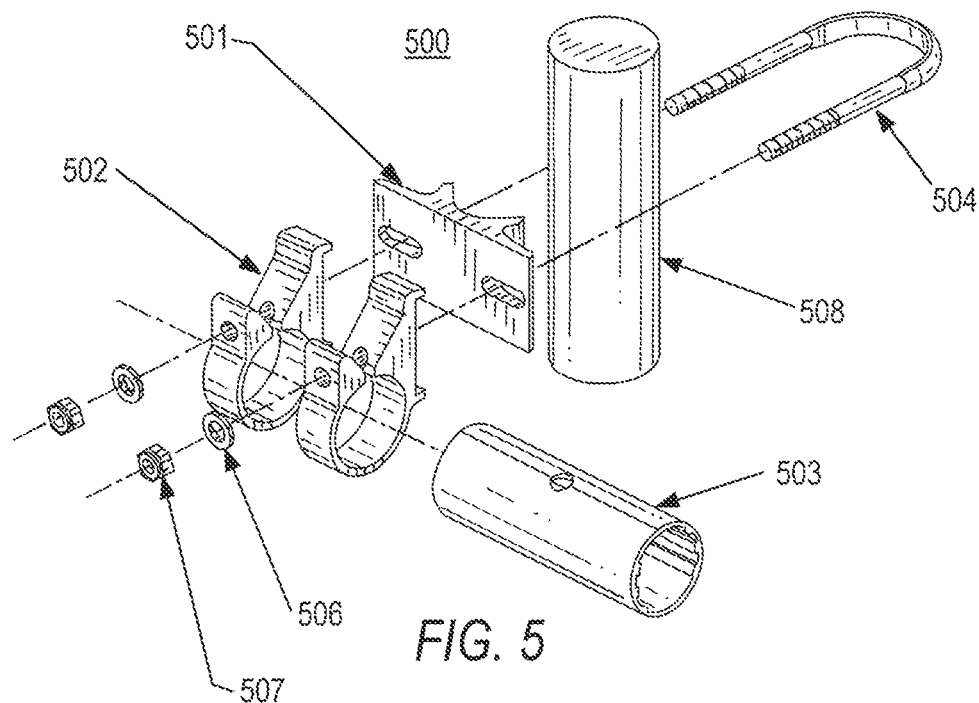
FIG. 5 shows an exploded view of a mounting system 500 of an accessory support for a mobility device in accordance with some embodiments.

FIG. 5 shows an exploded view of a mounting system 500 of an accessory support for a mobility device in accordance with some embodiments. Mounting system 500 can include a tube saddle 501, tube clamps 502, a support tube 503, a u-bolt 504, washers 506, and nuts 507. Mounting system 500 may be coupled to an anchor 508 of a mobility device to removably couple other elements of the accessory support (e.g., bottom tube assembly 100 of FIG. 2 and top tube assembly 300 of FIG. 3) to the mobility device. Mounting system 500 may be particularly well suited for mounting an accessory support to a front steer tube or a seat tube of a bicycle, for example.

Tube saddle 501 can include have cylindrically shaped members protruding from a first side. The cylindrically shaped members may be configured to engage a cylindrically-shaped anchor 508 of a mobility device (e.g., a front steer tube). A second side of tube saddle 501 may be flat and configured to engage tube clamps 502. Further, tube saddle 501 can include two holes situated on either side of the cylindrically shaped members to receive u-bolt 504, which loop around anchor 508 such that u-bolt 504 engages anchor 508 opposite tube saddle 501. Tube saddle 501 can be formed from any suitable material clamp onto anchor 508 while resisting significant deformation and/or adverse effects of weather. For example, tube saddle 501 may be formed from a metal (e.g., stainless steel or aluminum), a plastic (e.g., PVC), a composite, and/or any other suitable material.

Tube clamps 502 can be generally ring-shaped members for slidably and frictionally supporting support tube 503. Tube clamps 502 may include a first member for engaging the flat side of tube saddle 501. In particular, tube clamps 502 can include two flanges situated between a flat portion of the first member, where the flanges wrap around the top and bottom of tube saddle 501 (where the top and bottom of tube saddle 501 are positioned as installed on the mobility device and as pictured in FIG. 5). Thus, tube clamps 502 can provide vertical support for and resist vertical movement of tube saddle 501 with respect to anchor 508. Tube clamps 502 may also include holes extending through the first member and through a second protruding member for receiving u-bolt 504. Upon tightening nuts 507 against washers 506 on u-bolt 504, tube clamps 502 can clamp tube saddle 501 to anchor 508 while tightening around and securely clamping support tube 503 within the rings of tube clamps 502.

In some embodiments, support tube 503 may be formed with keying features that mate with the keying features of a mounting tube (e.g., mounting tube 301 of top tube assembly 400). The keying features of support tube 503 can ensure that the mounting tube does not rotate with respect to support tube 503 and, therefore, can be reliably adjusted to any desired angle. The keying features may be grooves or indentations that are spaced at any suitable pitch, where smaller pitches can correspond to finer adjustability of the mounting tube, while larger pitches can correspond to coarser adjustability of the mounting tube.

Figure 6:
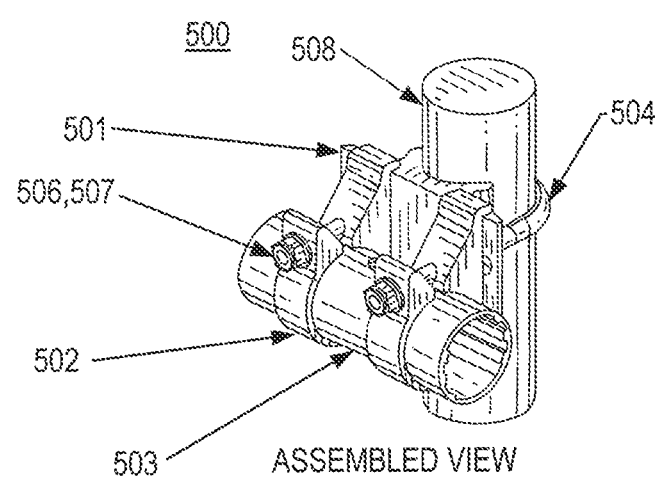
FIG. 6 shows an assembled mounting system 500 of an accessory support for a mobility device in accordance with some embodiments.

FIG. 6 shows an assembled mounting system 500 of an accessory support for a mobility device in accordance with some embodiments. In particular, assembled mounting system 500 may correspond to an assembled version of unassembled bottom tube assembly 500 of FIG. 5. Support tube 503 may be slidably and frictionally coupled within the rings of tube clamps 502 when nuts 507 are tightened on u-bolt 504. The components of mounting system 500 can be clamped to anchor 508 of a mobility device, which may be according to various configurations a bicycle head tube, a seat tube, or other suitable anchor point with u-bolt 504, and nuts 507 and washers 506. Note that this particular embodiment of the invention allows for the angle of the mounted tube 503 to be adjusted by rotating it within the support clamps 502 for the best possible alignment relative to anchor 508 to which it can be mounted.

Figure 7:
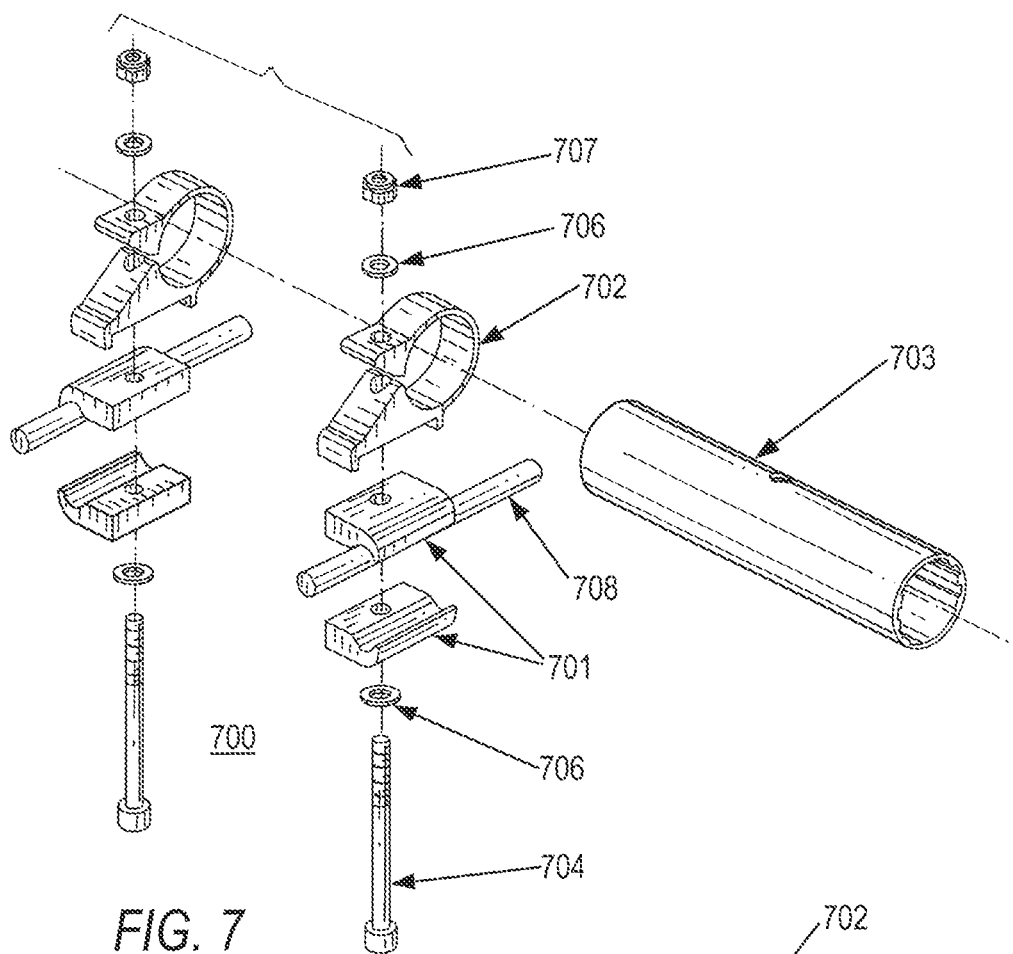
FIG. 7 shows an exploded view of a mounting system 700 of an accessory support for a mobility device in accordance with some embodiments.

FIG. 7 shows an exploded view of a mounting system 700 of an accessory support for a mobility device in accordance with some embodiments. Mounting system 700 can include rear rack clamps 701, tube clamps 702, a support tube 703, bolts 704, washers 706, and nuts 707. Mounting system 700 may be coupled to a rear rack 708 of a mobility device, for example, to removably couple other elements of the accessory support (e.g., bottom tube assembly 100 of FIG. 2 and top tube assembly 300 of FIG. 3) to the mobility device. Support tube 703 may be substantially similar to support tube 503 of FIG. 5 and may, therefore, include keying features that can mate with a mounting tube of a top tube assembly (e.g., mounting tube 301 of top tube assembly 300 of FIG. 4). The components can clamped to a standard bicycle rear rack 708 or similar structure installed on any suitable mobility device. In some embodiments, the same hardware may be used to mount mounting system 700 to any flat surface as well.

Rear rack clamps 701 can be two-member structures configured to clamp around pipes of rear rack 708. Accordingly, each member of rear rack clamps 701 can include a groove for engaging rear rack 708 as well as a flat portion extending away from rear rack 708. The flat portion of each member of rear rack clamps 701 can include a hole for receiving bolt 704. When nuts 707 are tightened on bolts 704, the two members of rear rack clamps 701 move towards each other, clamping rear rack 708 within the grooves of rear rack clamp 701.

Tube clamps 702 may be substantially similar to tube clamps 502 of FIG. 6. Thus, tube clamps 702 can be generally ring-shaped members for slidably and frictionally supporting support tube 703. Tube clamps 702 may include a first member configured to engage one member of rear rack clamps 701 (e.g., the top member of rear rack clamps as installed and as depicted in FIG. 7). In particular, tube clamps 702 can include two flanges situated between a flat portion of the first member, where the flanges wrap around edges of rear rack clamps 701. Accordingly, tube clamps 702 can provide horizontal support for and resist horizontal movement of support tube 703 with respect to rear rack 708. Tube clamps 702 may also include holes extending through the first member and through a second protruding member for receiving bolts 704. Upon tightening nuts 707 against washers 706 on rear rack clamps 701 and tube clamps 702, tube clamps 702 can clamp rear rack clamps 701 to rear rack 708 while tightening around and securely clamping support tube 703 within the rings of tube clamps 702.

Figure 8:
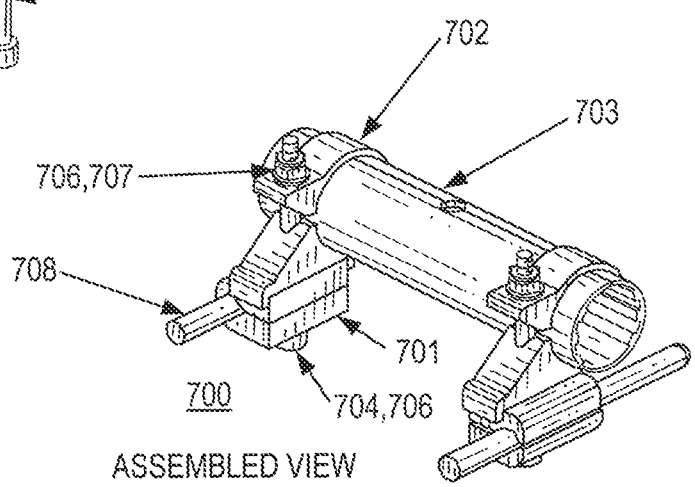
FIG. 8 shows an assembled mounting system 700 of an accessory support for a mobility device in accordance with some embodiments.

FIG. 8 shows an assembled mounting system 700 of an accessory support for a mobility device in accordance with some embodiments. In particular, assembled mounting system 700 may correspond to an assembled version of unassembled bottom tube assembly 700 of FIG. 7. Support tube 703 may be slidably and frictionally coupled within the rings of tube clamps 702 when nuts 707 are tightened on bolts 704 and rear rack clamps 701. The components of mounting system 700 can be clamped to a standard bicycle rear rack 708 or similar structure. In some embodiments, the same hardware may be used to mount the mounting system 700 to any flat surface as well. Note that this particular embodiment of the invention allows for the angle of the support tube 703 to be adjusted by rotating it within the tube clamps 702 for the best possible alignment relative to rear rack 708 or flat surface to which it is mounted.

Figures 9, 10:
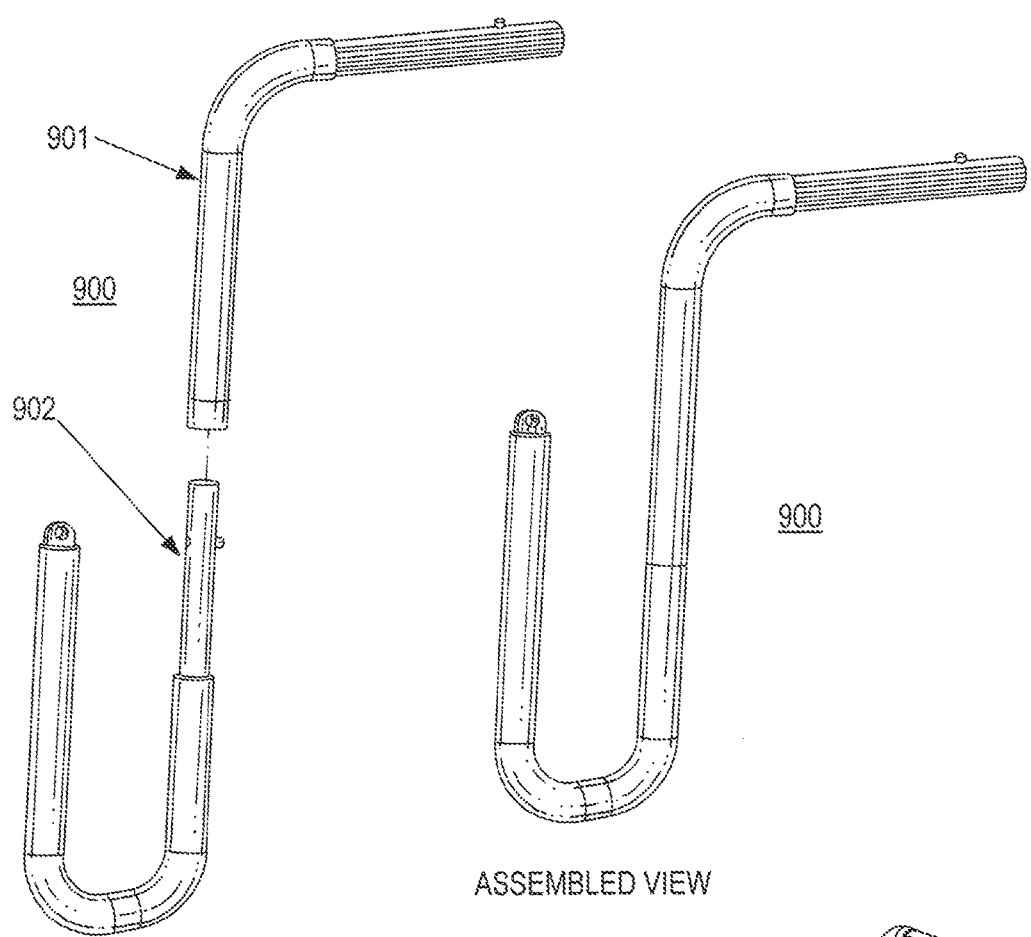
FIG. 9 shows an exploded view of an accessory support 900 for a mobility device in accordance with some embodiments.
FIG. 10 shows an assembled accessory support 900 for a mobility device in accordance with some embodiments.

FIG. 9 shows an exploded view of an accessory support 900 for a mobility device in accordance with some embodiments. Accessory support 900 can include top tube assembly 901 and bottom tube assembly 902. Top tube assembly 901 and bottom tube assembly 902 may correspond to top tube assembly 300 and bottom tube assembly 100 of FIGS. 5 and 3, respectively. The vertical portion of top tube assembly 901 may slidably engage a first end of bottom tube assembly 902 such that a spring button (e.g., spring button 103 of FIG. 1) protrudes from holes in both top tube assembly 901 and bottom tube assembly 902. The spring button may be used to easily couple and decouple top tube assembly 901 and bottom tube assembly 902. In some embodiments, this two part assembly may facilitate packing and shipping as well as quick and easy engagement to and disengagement from a mobility device (e.g., a bicycle).

FIG. 10 shows an assembled accessory support 900 for a mobility device in accordance with some embodiments. In particular, assembled accessory support 900 may correspond to an assembled version of unassembled accessory support 900 of FIG. 9. Although accessory support is depicted as a two-part structure, in some embodiments accessory support 900 may be unitarily manufactured from a single, contiguous tube.

Figure 11:
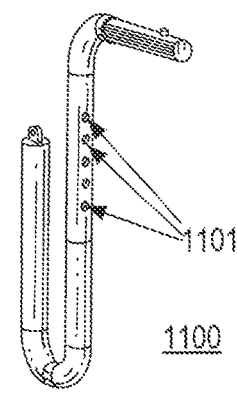
FIG. 11 shows a perspective view of an assembled accessory support 1100 for a mobility device in accordance with some embodiments.

FIG. 11 shows a perspective view of an assembled accessory support 1100 for a mobility device in accordance with some embodiments. In these embodiments, accessory support 1100 includes multiple holes 1101 that allow the dimensions of accessory to be adjusted. In particular, holes 1101 allow accessory support 1100 to be adjusted vertically from top to bottom, to accommodate various mounting configurations and cargo. Accessory support 1100 may be so adjusted by allowing the spring button to protrude from the various holes 1101.

FIG. 12 shows a perspective view of a partially assembled support structure 1200 for a mobility device in accordance with some embodiments. Support structure can include accessory support 1201, support tube 1202, spring button 1203, and keying features 1204, which can correspond to accessory support 900 of FIG. 10, support tube 503 of FIG. 6, spring button. 302 of FIG. 4, and keying features of support tube 503, respectively.

Support tube 1202 is shown attached to a vertical cylinder such as would be typical of a head tube or seat tube; however, any of the previous shown mounting configurations could be used in this assembly. Accessory support 1201 can be coupled to support tube 1202 by sliding the horizontal portion of accessory support 1201 into support tube 1202 such that spring button 1203 protrudes from a hole in support tube 1202, for example. In some embodiments, keying features 1204 on the two assemblies must be lined up to allow accessory support 1201 to be installed into support tube 1202, and the push button 1203 must be depressed, typically with a finger (i.e., without necessarily needing a tool). Accessory support 1201 can be slid into support tube 1202 until spring button 1203 "clicks" into the mating hole in support tube 1202. Removal of accessory support 1201 from support tube 1202 may be accomplished by pressing spring button 1203 with a finger to allow the accessory support 1201 to be slid out of support tube 1201. In other embodiments, however, a tool may be used to install or remove the accessory support 1201 and/or other parts of the support structure.

FIG. 13 shows a perspective view of an assembled support structure 1200 for a mobility device in accordance with some embodiments. In particular, support structure 1200 can correspond to an assembled version of support structure 1200 with accessory support 1201 installed into support tube 1202. Note that any number of these assemblies may be combined depending on the application and mobility device to which it is mounted. When fully installed, accessory support 1201 may have been slid into support tube 1202 until spring button 1203 locked into the mating hole on support tube 1202. Attachment ring 1205 may be used for securing cargo, such as surfboards, with a strap, or as a tying point for dogs or other pets to the end accessory support 1201.

FIG. 14 depicts a detailed view of a mounting system 1400 including keying features 1401 and 1402 in accordance with some embodiments. Mounting system 1400 may correspond to mounting system 500 of FIG. 6, for example. Keying features 1401 may be a key feature of some embodiments of the installation, particularly where a quick release is desired. In these embodiments, keying features 1401 of mounting system 1400 can mate with the keying features 1402 of an accessory support. Keying features 1401 and 1402 may prevent the accessory support from rotating within the support tube, meaning that only a light duty spring button is required to secure the accessory support to the support tube.

Figure 15:
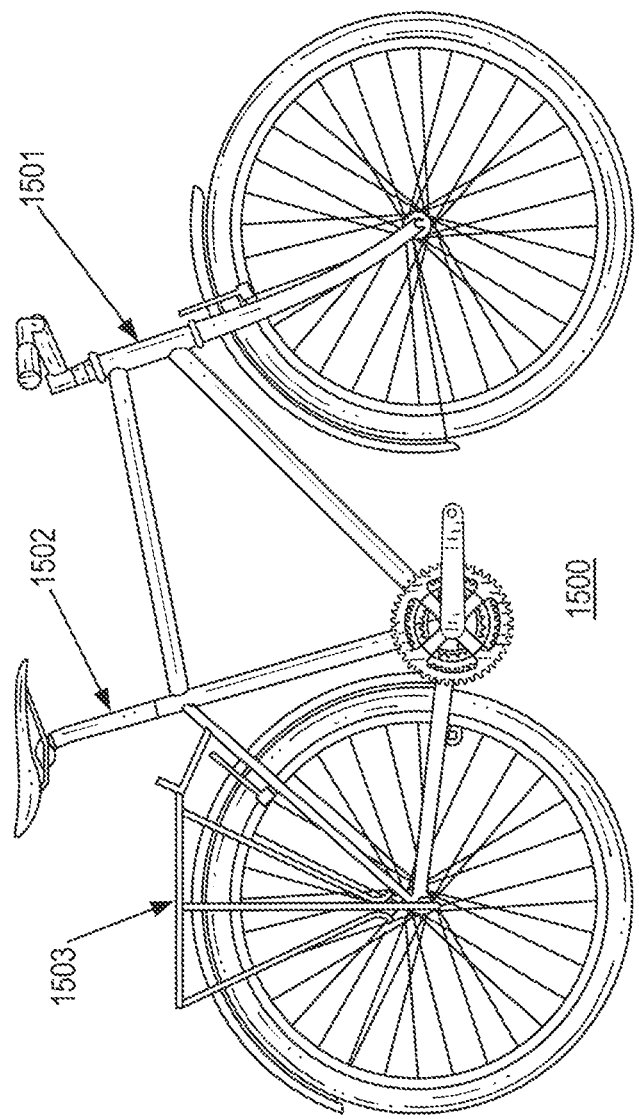
FIG. 15 shows an elevation view of an illustrative mobility device. In particular, the example in FIG. 15 depicts a view of a standard bicycle 1500 in accordance with some embodiments.

FIG. 15 shows an elevation view of an illustrative mobility device. In particular, the example in FIG. 15 depicts a view of a standard bicycle 1500 in accordance with some embodiments. This view is intended to highlight the three mounting regions identified on a standard bicycle for attachment of support structures (e.g., support structure 1200 of FIG. 13). Most standard bicycles have a head tube 1501, which is an integral part of the frame and very strong. Other parts of the frame may be made of light gauge aluminum or steel, but head tubes are typically of a stronger construction and better suited to receiving a clamp on receiver for a support structure. Most standard bicycles also include a seat post 1502. Seat post 1502 can carry the full weight of the rider and is, much like the head tube, a strong attachment point on the frame. Mounting system 500 of FIG. 6 may be particularly well suited for mounting an accessory support to head tube 1501 and/or seat post 1502.

Many bicycles have or can be equipped to have a rear cargo rack 1503. Standard Cargo racks may have a common construction type to accommodate standard panniers or cargo bags, which typically include two tubes of 6-10 mm in diameter that run parallel down the outside edges of the rear rack or carrier. Such cargo racks provide a strong yet versatile mounting point for support structures. Mounting system 700 of FIG. 8 may be particularly well suited for mounting an accessory support to rear cargo rack 1503.

It will be appreciated to those skilled in the art that the preceding examples and embodiments are exemplary and not limiting to the scope of the present invention. It is intended that all permutations, enhancements, equivalents, and improvements thereto that are apparent to those skilled in the art upon a reading of the specification and a study of the drawings are included within the true spirit and scope of the present invention.

What is claimed is:
1. A support structure for a mobility device, comprising:
an accessory support comprising:
a U-shaped member comprising a first end and a second end;
an L-shaped member comprising a vertical portion and a horizontal portion, the vertical portion of the L-shaped member being configured to couple to the first end of the U-shaped member; and
a spring button comprising a projection inserted into the first end U-shaped member, wherein the projection protrudes from a mating hole of the U-shaped member and a mating hole comprising the vertical portion of the L-shaped member to removably couple the U-shaped member to the L-shaped member; and
a mounting system comprising a support tube, wherein the support tube is configured to couple to the mobility device, such that the support tube extends perpendicularly with respect to a longitudinal axis of the mobility device, and wherein the horizontal portion of the L-shaped member is parallel to the support tube and configured to couple to the support tube.

2. The support structure of claim 1, wherein the vertical portion of the L-shaped member comprises a plurality of mating holes for adjusting a height of the support structure, and wherein the projection protrudes from one of the plurality of mating holes.

3. The support structure of claim 1, further comprising a second spring button comprising a second projection inserted into the horizontal portion of the L-shaped member, wherein the second projection protrudes from a mating hole of the L-shaped member and a mating hole of the support tube to removably couple the L-shaped member to the support tube.

4. The support structure of claim 1, wherein:
the horizontal portion of the L-shaped member includes at least one keying feature comprised of at least one groove or indentation, and
the support tube includes at least one complementary keying feature comprised of at least one complementary groove or indentation, such that an engagement of the at least one keying feature with the at least one complementary keying feature prevents rotation of the L-shaped member with respect to the support tube.

5. The support structure of claim 1, wherein at least two U-shaped members are configured to jointly carry a large flat object to a side of the mobility device when at least two accessory supports, each corresponding to a U-shaped member, are mounted to the mobility device.

6. The support structure of claim 1, further comprising an attachment ring coupled to the second end of the U-shaped member to secure a live animal while also preventing the animal from running into moving parts of the mobility device.

7. A support structure system for a mobility device, comprising:
a plurality of accessory supports, each comprising:
a U-shaped member comprising a first end and a second end; and
an L-shaped member comprising a vertical portion and a horizontal portion, the vertical portion of the L-shaped member being configured to couple to the first end of the U-shaped member; and
a plurality of mounting systems, each comprising a support tube, wherein
the support tube is configured to couple to the mobility device, such that the support tube extends perpendicularly with respect to a longitudinal axis of the mobility device, and wherein the horizontal portion of the L-shaped member is parallel to the support tube and configured to couple to the support tube, wherein a first accessory support of the plurality of accessory supports is mounted to a steer tube of the mobility device with a first mounting system of the plurality of mounting systems, and wherein a second accessory support of the plurality of accessory supports is mounted to a seat tube of the mobility device with a second mounting system of the plurality of mounting systems.

8. A support structure system for a mobility device, comprising:
   a plurality of accessory supports, each comprising:
      a U-shaped member comprising a first end and a second end; and
      an L-shaped member comprising a vertical portion and a horizontal portion, the vertical portion of the L-shaped member being configured to couple to the first end of the U-shaped member; and
   a plurality of mounting systems, each comprising a support tube, wherein
      the support tube is configured to couple to the mobility device, such that the support tube extends perpendicularly with respect to a longitudinal axis of the mobility device, and wherein the horizontal portion of the L-shaped member is parallel to the support tube and configured to couple to the support tube, wherein a first accessory support of the plurality of accessory supports is mounted to a first set of one or more anchors of the mobility device with a first mounting system of the plurality of mounting systems, and wherein a second accessory support of the plurality of accessory supports is mounted to a second set of one or more anchors of the mobility device with a second mounting system of the plurality of mounting systems.

9. A support structure for a mobility device, comprising:
   an accessory support comprising:
      a U-shaped member comprising a first end and a second end;
      an L-shaped member comprising a vertical portion and a horizontal portion, the vertical portion of the L-shaped member being configured to couple to the first end of the U-shaped member; and
      a spring button comprising a projection inserted into the horizontal portion of the L-shaped member, wherein the projection protrudes from a mating hole comprising the horizontal portion of the L-shaped member and a mating hole of a support tube to removably couple the L-shaped member to the support tube; and
   a mounting system comprising the support tube, wherein
      the support tube is configured to couple to the mobility device, such that the support tube extends perpendicularly with respect to a longitudinal axis of the mobility device, and wherein the horizontal portion of the L-shaped member is parallel to the support tube and configured to couple to the support tube.

10. The support structure of claim 9, further comprising a second spring button comprising a second projection inserted into the first end of the U-shaped member, wherein the second projection protrudes from a mating hole of the U-shaped member and a mating hole comprising the vertical portion of the L-shaped member to removably couple the U-shaped member to the L-shaped member.

11. The support structure of claim 10, wherein the vertical portion of the L-shaped member comprises a plurality of mating holes for adjusting a height of the support structure, and wherein the projection protrudes from one of the plurality of mating holes.

12. The support structure of claim 9, wherein:
    the horizontal portion of the L-shaped member includes at least one keying feature comprised of at least one groove or indentation, and
    the support tube includes at least one complementary keying feature comprised of at least one complementary groove or indentation, such that an engagement of the at least one keying feature with the at least one complementary keying feature prevents rotation of the L-shaped member with respect to the support tube.

13. The support structure of claim 9, wherein at least two U-shaped members are configured to jointly carry a large flat object to a side of the mobility device when at least two accessory supports, each corresponding to a U-shaped member, are mounted to the mobility device.

14. The support structure of claim 9, further comprising an attachment ring coupled to the second end of the U-shaped member to secure a live animal while also preventing the animal from running into moving parts of the mobility device.

15. A support structure for a mobility device, comprising:
    an accessory support comprising:
       a U-shaped member comprising a first end and a second end, wherein an attachment ring is coupled to the first end of the U-shaped member to secure a live animal while also preventing the animal from running into moving parts of the mobility device; and
       an L-shaped member comprising a vertical portion and a horizontal portion, the vertical portion of the L-shaped member being configured to couple to the first end of the U-shaped member; and
    a mounting system comprising a support tube, wherein
       the support tube is configured to couple to the mobility device, such that the support tube extends perpendicularly with respect to a longitudinal axis of the mobility device, and wherein the horizontal portion of the L-shaped member is parallel to the support tube and configured to couple to the support tube.

16. The support structure of claim 15, further comprising a spring button comprising a projection inserted into the second end of the U-shaped member, wherein the projection protrudes from a mating hole of the U-shaped member and a mating hole comprising the vertical portion of the L-shaped member to removably couple the U-shaped member to the L-shaped member.

17. The support structure of claim 16, wherein the vertical portion of the L-shaped member comprises a plurality of mating holes for adjusting a height of the support structure, and wherein the projection protrudes from one of the plurality of mating holes.

18. The support structure of claim 15, further comprising a spring button comprising a projection inserted into the horizontal portion of the L-shaped member, wherein the projection protrudes from a mating hole of the L-shaped member and a mating hole of the support tube to removably couple the L-shaped member to the support tube.

19. The support structure of claim 15, wherein:
    the horizontal portion of the L-shaped member includes at least one keying feature comprised of at least one groove or indentation, and
    the support tube includes at least one complementary keying feature comprised of at least one complementary groove or indentation, such that an engagement of the at least one keying feature with the at least one complementary keying feature prevents rotation of the L-shaped member with respect to the support tube.

20. The support structure of claim 15, wherein at least two U-shaped members are configured to jointly carry a large flat object to a side of the mobility device when at least two accessory supports, each corresponding to a U-shaped member, are mounted to the mobility device.

21. A support structure for a mobility device, comprising:
an accessory support comprising:
   a U-shaped member comprising an end; and
   an L-shaped member comprising a vertical portion and a horizontal portion, wherein the U-shaped member and the L-shaped member are unitarily formed from a single, contiguous tube; and
a mounting system comprising a support tube, wherein
   the support tube is configured to couple to the mobility device, such that the support tube extends perpendicularly with respect to a longitudinal axis of the mobility device, and wherein the horizontal portion of the L-shaped member is parallel to the support tube and configured to couple to the support tube.

22. The support structure of claim 21, further comprising a spring button comprising a projection inserted into the horizontal portion of the L-shaped member, wherein the projection protrudes from a mating hole of the L-shaped member and a mating hole of the support tube to removably couple the L-shaped member to the support tube.

23. The support structure of claim 21, wherein:
   the horizontal portion of the L-shaped member includes at least one keying feature comprised of at least one groove or indentation, and
   the support tube includes at least one complementary keying feature comprised of at least one complementary groove or indentation, such that an engagement of the at least one keying feature with the at least one complementary keying feature prevents rotation of the L-shaped member with respect to the support tube.

24. The support structure of claim 21, wherein at least two U-shaped members are configured to jointly carry a large flat object to a side of the mobility device when at least two accessory supports, each corresponding to a U-shaped member, are mounted to the mobility device.

25. The support structure of claim 21, further comprising an attachment ring coupled to the end of the U-shaped member to secure a live animal while also preventing the animal from running into moving parts of the mobility device.

* * * * *